United States Patent [19]

Stefancich

[11] 4,430,017
[45] Feb. 7, 1984

[54] MUSICAL INSTRUMENT SUPPORT

[75] Inventor: Kenneth G. Stefancich, Chicago, Ill.

[73] Assignee: Mardan Corp., Elkhart, Ind.

[21] Appl. No.: 373,006

[22] Filed: Apr. 29, 1982

[51] Int. Cl.³ .............................................. F16B 7/14
[52] U.S. Cl. .................................... 403/104; 403/109; 403/377; 248/411; 248/295.1
[58] Field of Search ............... 403/104, 377, DIG. 9, 403/379, 109; 248/411, 412, 295.1, 296, 354

[56] References Cited

U.S. PATENT DOCUMENTS

| 4,111,575 | 9/1978 | Hoshino | 403/104 |
| 4,140,415 | 2/1979 | Koyamato | 403/104 |
| 4,185,936 | 1/1980 | Takahashi | 403/104 |

FOREIGN PATENT DOCUMENTS

| 1128160 | 8/1956 | France | 248/354.1 |
| 1165725 | 6/1958 | France | 248/354.1 |

Primary Examiner—Andrew V. Kundrat
Assistant Examiner—Joseph A. Fischetti
Attorney, Agent, or Firm—Barnes & Thornburg

[57] ABSTRACT

A musical instrument support having a clamp for releasably coaxially securing an instrument post to a tubular floor support, or the like. The clamp includes a housing secured to the upper end of the tubular support and having an opening receiving a resilient locking body. The locking body is caused to clamp the lower end of the post inserted in a socket portion thereof by selective operation of a camming structure urging leg portions of the locking body against guide surfaces to effect the clamping operation.

12 Claims, 5 Drawing Figures

MUSICAL INSTRUMENT SUPPORT

BACKGROUND OF THE INVENTION

1. Field of the Invention

This invention relates to musical instruments and in particular to musical instruments, such as cymbals and the like, supported on adjustable posts, and more specifically, to means for locking the support post in adjusted disposition in such instruments.

2. Description of the Background Art

Musical instruments, such as cymbals, drums, etc., have conventionally been supported for play by the musician on a floor stand having a lower, three-legged floor support and an upper post adjustably positioned in the lower support for adjusting the height of the instrument carried by the post. A number of different securing, or locking, devices have been provided for adjustably retaining the post in adjusted position on the support.

The use of camming means for effecting a clamping action in a connector for adjustably connecting two elongated elements in substantially coaxial alignment is well-known. Illustratively, U.S. Pat. No. 1,074,839 of Curry illustrates a lock joint wherein a wedge is constricted about a hub to lock the hub against movement in the socket.

A clamping means utilizing triangular and hexagonal bearing surfaces in different embodiments is illustrated in Thines U.S. Pat. No. 2,445,543.

An inward clamping operation is illustrated in Meinunger U.S. Pat. No. 3,941,492.

Clements U.S. Pat. No. 1,918,519 teaches the use of a cam to urge an upper handle member against a tubular lower handle member.

SUMMARY OF THE INVENTION

The present invention comprehends an improved means for clamping a musical instrument post in adjusted disposition on a tubular support wherein a camming means is received within a housing in one end of a compressible clamp locking body.

More specifically, the invention comprehends such an improved clamp for coaxially securing a musical instrument post to a tubular support including a housing having a through opening and a camming portion adjacent said opening defined by converging guide surfaces, means for securing the housing to a tubular support with the through opening aligned with the axis of the support, a resilient locking body in the opening having a bight portion, and spaced legs including inturned end portions adjacent the guide surfaces, the legs cooperatively defining an included socket for receiving a post to be secured to the tubular support, camming means within the locking body bight portion for urging the leg end portions against the guide surfaces to be guided thereby toward each other for causing the legs to securely grip the post in the socket, and means for manually operating the camming means for selectively securing and releasing the post.

In the illustrated embodiment, the camming means comprises a cylindrical element and means for eccentrically journaling the cylindrical element in the housing.

The invention further comprehends the provision of a force transfer wall member, or plate, slidingly engaged by the cylindrical camming element for urging the legs of the locking body against the guide surfaces in effecting the locking operation.

In the illustrated embodiment, the guide surfaces are planar.

The invention comprehends the provision of a stop surface between the guide surfaces for guiding the distal ends of the inturned end portions of the locking body legs perpendicularly to the longitudinal extent of the legs.

Relief recesses may be provided at the ends of the stop surfaces for improved control of the gripping action of the locking body legs.

In the illustrated embodiment, the structure is arranged to dispose the post coaxially within the upper end of the tubular support.

In the illustrated embodiment, the means for operating the camming means comprises an integral extension of a portion of the means for journaling the cylindrical element in the housing.

Suitable bushings may be provided in the housing for journaling the camming means.

Means are provided in the illustrated embodiment for retaining the cylindrical element against axial displacement in operation.

Thus, the musical instrument support clamp is extremely simple and economical of construction while yet providing an improved positive locking function as discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
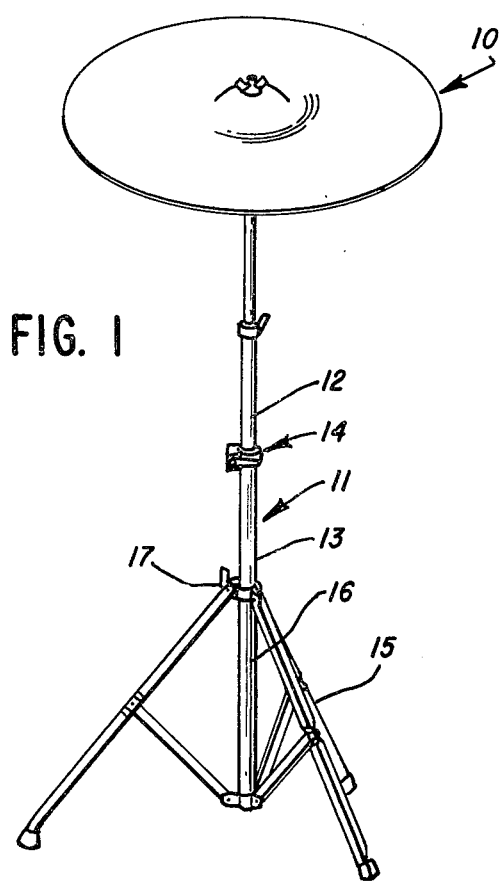
FIG. 1 is a perspective view of a musical instrument having a locking clamp embodying the invention.

In the exemplary embodiment of the invention as disclosed in the drawing, a musical instrument, such as cymbal 10, is provided on a stand generally designated 11 having an upper post 12 vertically adjustably secured to a floor support 13 by a clamp generally designated 14.

The floor support may be provided with suitable legs 15 connected to the tubular upright 16 of the floor support by suitable movable connecting and clamping structure 17 for selectively arranging the legs in an extended tripod disposition, as shown in FIG. 1 of the drawing, or in a collapsed position adjacent the tubular upright 16 (not shown).

Figure 3:
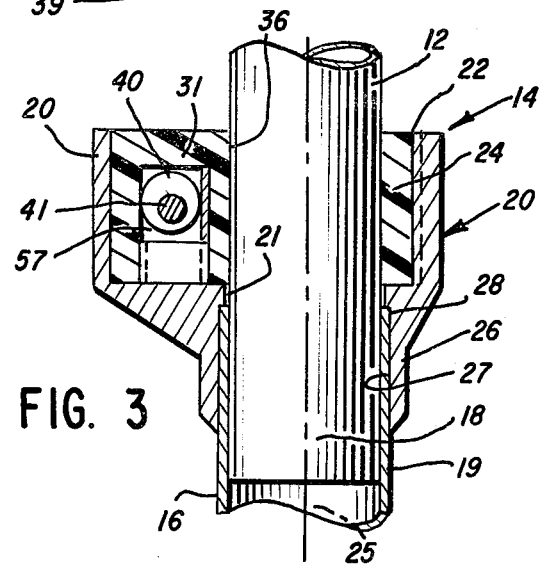
FIG. 3 is a vertical section taken substantially along the line 3—3 of FIG. 2.
Figure 5:
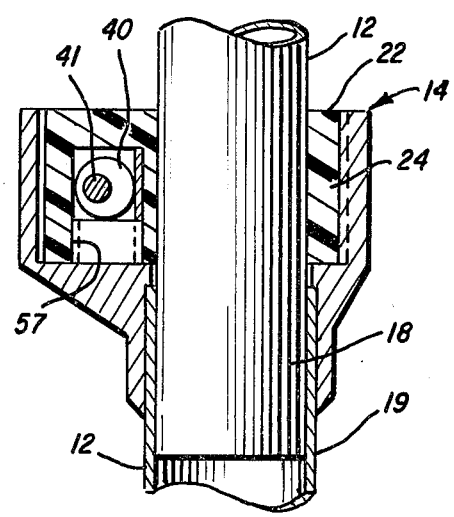
FIG. 5 is a diametric section of the clamp in the post clamping disposition.

As best seen in FIGS. 3 and 5, clamp 14 selectively clamps the upper post 12 with its lower end 18 telescopically received in the upper end 19 of tubular upright 16. As shown, the clamp 14 includes a housing 20 having a through opening 21 and a camming portion 22 adjacent the through opening which is defined by converging guide surfaces 23 and 24.

Housing 20 is secured to the tubular support end 19, with the through opening 21 coaxially aligned with the axis 25 of the support by means of an extension 26 of the housing defining a cylindrical opening portion 27 comprising the lower end of the through opening 21 of the housing. At the upper end, opening portion 27 defines an annular shoulder 28, which abuts the upper end of the tubular support end 19 in the fully installed disposition, as seen in FIG. 3.

As shown, the upper end of the housing defines a clamping space 29, in which is received a resilient locking means 30 including a first U-shaped clamp member 30a and a second U-shaped clamp member 30b. The clamp member 30a includes a bight portion 31 and parallel, spaced legs 33. Second clamp member 30b defines outturned leg portions 34 and 35, respectively, terminating in leg end portions 32 spaced adjacent legs 33 of first clamp member 30a. Leg portions 34 and 35 abut the guide surfaces 23 and 24, as seen in FIG. 2.

Figure 2:
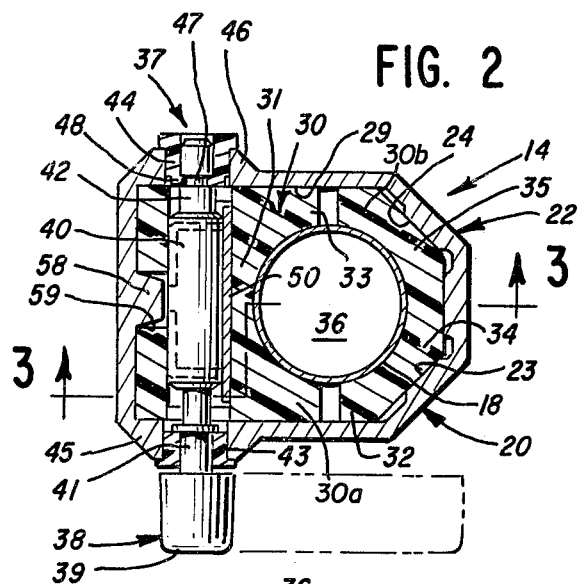
FIG. 2 is a horizontal section of the locking clamp.
Figure 4:
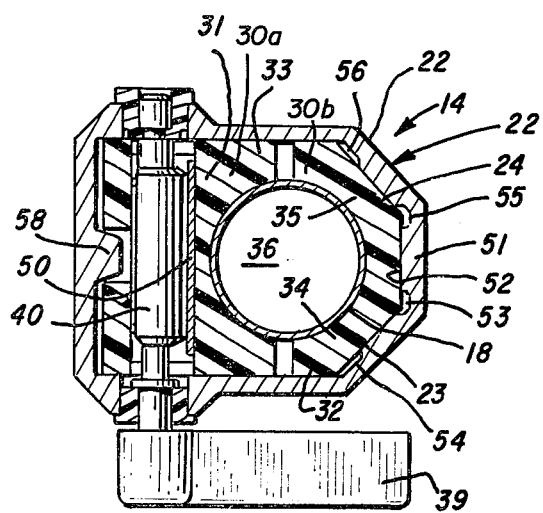
FIG. 4 is a section similar to that of FIG. 2 but with the clamp arranged in the post clamping disposition.

As shown in FIGS. 2 and 4, clamp members 30a and 30b cooperatively define an included socket 36, which receives the lower end 18 of post 12. Camming means 37 are provided for urging the leg portions 34 and 35 against the guide surfaces 23 and 24 to be guided thereby toward each other for causing the legs to securely grip the post end 18 in socket 36. As shown, means generally designated 38 are provided for selectively securing and releasing the post end by suitable operation of camming means 37. In the illustrated embodiment, the camming means is disposed within the bight portion 31 of clamp member 30a and the operating means comprises a handle 39 disposed exteriorly of the housing 20.

Camming means 37 includes a cylindrical camming element 40 having integral oppositely projecting eccentric shaft portions 41 and 42 journaled in suitable bushings 43 and 44, respectively. The bushings are mounted respectively in enlarged portions 45 and 46 of the housing. Shaft end 42 is provided with a suitable annular recess 47 receiving an inturned annular flange 48 of bushing 44 for retaining the cam element 40 against axial displacement in the housing. Camming means 37 further includes a force transfer wall member 50 comprising a flat metal plate adapted to be engaged by the eccentrically mounted cylindrical camming element 40 for transferring the camming force from the camming means through the clamp member 30a against post end 18 to effect the cooperative locking of the clamp members about post end 18, as illustrated in FIGS. 4 and 5. In effecting the gripping action, the camming means urges the portions 34 and 35 against the camming surfaces 23 and 24 of housing camming portion 22, which, in turn, urge the inturned ends 34 and legs 32 toward legs 33.

As best seen in FIG. 4, housing portion 22 further includes a central front portion 51 defining a stop surface 52 extending transversely to the longitudinal extent of legs 32 for urging turned leg portions 34 and 35 along surfaces 23 and 24.

As further seen in FIG. 4, housing portion 22 defines a first relief recess 53 at the juncture of the stop surface 52 and first guide surface 23, and a relief recess 54 at the outwardly spaced end of the guide surface 23 remote from stop surface 52. Similarly, housing portion 22 is provided with a second relief recess 55 at the juncture of stop surface 52 with guide surface 24 and a second outer relief recess 56 at the outer end of guide surface 24 remote from stop surface 52. The relief recesses have been found to provide improved movement of the clamp member leg portions 34 and 35, preventing binding and hangup of the leg portions in effecting the desired locking grip on the enclosed post portion 18, as illustrated in FIG. 4.

In the illustrated embodiment, guide surfaces 23 and 24 define planar surfaces. In the uncompressed arrangement of FIG. 2, leg portions 32, 34 and 35 are complementary to the internal surface configuration of housing 20. As shown, leg portions 32 and 33 are spaced from each other permitting the desired gripping action as a result of the operation of camming means 37, as discussed above.

Locking means 30 is effectively retained in clamping space 29 by the camming means 37 which, as shown in FIG. 2, extends through bight portion 31 and, more specifically, through a downwardly opening recess 57 in bight portion 31, as best seen in FIG. 3. Additionally, housing 20 is provided with a boss 58 projecting into a complementary recess 59 in the rear of bight 31, further effectively retaining locking body 30 in the clamping space.

In the illustrated embodiment, cylindrical element 40, shaft ends 41 and 42, and operating handle 39 comprise a unitary, one-piece device for facilitated low cost manufacture of the clamp structure. The one-piece unit may be formed illustratively as by die casting of suitable metal. The bushings 43 and 44, in the illustrated embodiment, are formed of a synthetic resin, such as nylon or the like. Locking means clamp members 30a and 30b are molded of a suitable synthetic resin, such as polyurethane. Housing 20 illustratively is formed as a die cast metal housing.

In use, the musician adjusts the height of the telescopic association of post end 18 and tubular support end 19 with the clamp in the released disposition of FIG. 2. With the post in the desired position, the user simply rotates handle 39 to the locking postion of FIG. 4. Such movement of the handle correspondingly rotates cam cylinder 40 to urge it against the force transfer plate 50, as seen in FIG. 4, urging the leg portions 34 and 35 against camming guide surfaces 23 and 24, thereby effectively deforming the locking means about post end 18 and locking the post end in the adjusted disposition.

To readjust the position of post 12, the user simply reversely swings handle 39 to the released position of FIG. 2 and then carries out the adjusting and reclamping operations, as discussed above.

The post clamp is extremely simple and economical of construction while yet providing a highly improved, readily adjusted, and lockable clamping means for advantageous use in adjustably locking a post to a tubular support, such as in a musical instrument, as illustrated in the disclosure.

The foregoing disclosure of specific embodiments is illustrative of the broad invention concepts comprehended by the invention.

I claim:

1. A clamp for coaxially securing a post to a tubular support, comprising:

a housing having a through opening and a camming portion adjacent said opening defined by a midportion and converging planar guide surfaces;

means for securing the housing to a tubular support with the through opening aligned with the axis of the support;

resilient locking means in said opening having a blind recess in one end thereof and opening parallel to said housing through opening for receiving a camming means when the locking means is mounted in said opening, including a first U-shaped clamp member having a bight portion and spaced legs having end portions, a second U-shaped clamp member opposed to said first member and having a bight portion and spaced legs extending from adjacent said guide surfaces to adjacent said end portions of the first clamp member legs, the legs and bights of said first and second clamp portions cooperatively defining an included socket for receiving a post to be secured to the tubular support;

said camming means being disposed within said first clamp member bight portion for urging said first clamp member against the post and the post against said second clamp member to urge the second clamp member against said midportion and compressively urge the legs thereof against the guide surfaces to cause the legs of said second clamp member to be guided thereby toward the legs of said first clamp member to securely grip the post in said socket; and means for manually operating the camming means for selectively securing and releasing the post.

2. The post clamp of claim 1 wherein said camming means comprises a cylindrical element, and means for eccentrically journaling the cylindrical element in said housing to move the element selectively toward and from said housing midportion.

3. The post clamp of claim 1 wherein said camming means comprises a cylindrical element, means for eccentrically journaling the cylindrical element in said housing to move the element selectively toward and from said housing midportion, and a force transfer wall member slidingly engaged by said cylindrical element intermediate said cylindrical element and said first clamp member for urging the post and second clamp member toward said housing midportion and guide surfaces as a result of force transferral to said wall member by said camming means.

4. The post clamp of claim 1 wherein said housing defines a stop surface between said guide surfaces extending transversely to the longitudinal extent of said legs for urging the leg portions of said second clamp member along said guide surfaces.

5. The post clamp of claim 1 wherein said housing midportion defines a stop surface between said guide surfaces extending transversely to the longitudinal extent of said legs for urging the leg portions of said second clamp member along said guide surfaces, and a relief recess at the juncture of said stop surface with each of said guide surfaces.

6. The post clamp of claim 1 wherein said housing midportion defines a stop surface between said guide surfaces extending transversely to the longitudinal extent of said legs for urging the leg portions of said second clamp member along said guide surfaces, and a relief recess at the outwardly spaced ends of the guide surfaces remote from said stop surface.

7. The post clamp of claim 1 wherein said camming means includes a force transfer plate within said bight portion of the first clamp member extending perpendicularly to the longitudinal extent of said legs.

8. The post clamp of claim 1 wherein said means for securing the housing to the tubular support comprises an extension of the housing defining a cylindrical opening for coaxially receiving an end of the tubular support, said cylindrical opening being coaxially aligned with said socket for receiving the end of the post coaxially telescopically within said cylindrical opening and the end of the tubular support therein.

9. The post clamp of claim 1 wherein said camming means comprises a cylindrical element, and means for eccentrically journaling the cylindrical element in said housing to move the element selectively toward and from said guide surfaces, said means for operating the camming means comprising an integral extension of a portion of said means for journaling said cylindrical element, said cylindrical element, journaling means, and operating means comprising a one-piece device.

10. The post clamp of claim 1 wherein said camming means comprises a cylindrical element, and means for eccentrically journaling the cylindrical element in said housing to move the element selectively toward and from said guide surfaces, said journaling means comprising bushings mounted in said housing and coaxial shafts extending longitudinally from opposite ends of the cylindrical element and journaled in said bushings.

11. The post clamp of claim 1 wherein said camming means comprises a cylindrical element, and means for eccentrically journaling the cylindrical element in said housing to move the element selectively toward and from said guide surfaces, said journaling means comprising bushings mounted in said housing and coaxial shafts extending longitudinally from opposite ends of the cylindrical element and journaled in said bushings, said housing defining portions of increased wall thickness mounting said bushings therein.

12. The post clamp of claim 1 wherein said camming means comprises a cylindrical element, and means for eccentrically journaling the cylindrical element in said housing to move the element selectively toward and from said guide surfaces, said journaling means comprising shoulder means for retaining said cylindrical element against axial movement.

* * * * *